(12) United States Patent
Zhang et al.

(10) Patent No.: US 10,724,699 B2
(45) Date of Patent: Jul. 28, 2020

(54) OPTICAL DEVICE

(71) Applicant: Lumileds Holding B.V., Schiphol (NL)

(72) Inventors: Milly Zhang, Shanghai (CN); Ping Wu, Shanghai (CN)

(73) Assignee: LUMILEDS HOLDING B.V. (NL)

( * ) Notice: Subject to any disclaimer, the term of this patent is extended or adjusted under 35 U.S.C. 154(b) by 0 days.

(21) Appl. No.: 16/547,302

(22) Filed: Aug. 21, 2019

(65) Prior Publication Data
US 2020/0063935 A1 Feb. 27, 2020

(30) Foreign Application Priority Data

Aug. 22, 2018 (WO) ................ PCT/CN2018/101632
Dec. 11, 2018 (WO) ................ PCT/CN2018/120278
Jan. 8, 2019 (EP) .................................... 19150761

(51) Int. Cl.
*F21S 41/24* (2018.01)
*F21S 41/25* (2018.01)
*F21V 5/00* (2018.01)

(52) U.S. Cl.
CPC ............... *F21S 41/24* (2018.01); *F21S 41/25* (2018.01); *F21V 5/007* (2013.01)

(58) Field of Classification Search
CPC ........ F21S 41/24; F21S 43/236; F21S 43/241; F21S 43/242; F21V 5/007
See application file for complete search history.

(56) References Cited

U.S. PATENT DOCUMENTS 5,931,576 A * 8/1999 Kreysar .................... F21V 9/00
   362/552
8,801,242 B2 * 8/2014 Hamm .................. F21S 41/143
   362/487
(Continued)

FOREIGN PATENT DOCUMENTS

DE    102009053581         3/2011
DE    102012213845 A1      2/2014
(Continued)

OTHER PUBLICATIONS

Extended European Search Report dated Jul. 15, 2019, European Application No. 19150761.5, 9 pages.
(Continued)

*Primary Examiner* — Julie A Bannan

(57) ABSTRACT

The present invention relates to an optical device for automotive lighting. The optical device comprises: a plurality of light sources; a plurality of primary optics arranged in a matrix and configured to receive and redirect light from the plurality of light sources; and a secondary optics configured to receive the redirected light from the plurality of primary optics and project out the received light into a desired beam pattern. Each of the primary optics is shaped as a light guide with a light entrance face and a light exit face at two opposite ends thereof, which light guide is configured to guide light incident at the light entrance face via total internal reflection to the light exit face where light is refracted out towards the secondary optics. Each light guide further comprises a plurality of side faces extending between the light entrance face and the light exit face. For at least one light guide, at least one side face comprises a curved face, whose curvatures at different positions are designed, by sweeping a polygonal line along a direction perpendicular to the desired direction and perpendicular to a light guiding direction of the at least one light guide, such that a first desired gradient (Continued)

light intensity distribution is projected out along a desired direction by the secondary optics.

14 Claims, 3 Drawing Sheets

(56) References Cited

U.S. PATENT DOCUMENTS

| | | | |
|---|---|---|---|
| 9,046,237 B2 | 6/2015 | Stefanov et al. | |
| 9,250,378 B2 | 2/2016 | Lamberterie | |
| 9,476,558 B2* | 10/2016 | Stefanov | F21S 41/663 |
| 9,982,862 B2 | 5/2018 | Stefanov et al. | |
| 10,018,317 B2 | 7/2018 | Taudt et al. | |
| 2013/0051014 A1* | 2/2013 | Sikkens | F21V 13/04 |
| | | | 362/235 |
| 2014/0198513 A1* | 7/2014 | Stefanov | F21S 41/24 |
| | | | 362/511 |
| 2014/0321141 A1* | 10/2014 | Bauer | F21S 41/255 |
| | | | 362/511 |
| 2015/0124469 A1* | 5/2015 | Krenn | F21S 41/43 |
| | | | 362/511 |
| 2015/0167913 A1* | 6/2015 | Stefanov | F21S 41/153 |
| | | | 362/511 |
| 2015/0226395 A1* | 8/2015 | Taudt | F21S 41/663 |
| | | | 362/511 |
| 2017/0089536 A1* | 3/2017 | Courcier | F21S 41/24 |
| 2017/0130923 A1* | 5/2017 | Nishimura | F21S 41/43 |
| 2018/0313511 A1* | 11/2018 | Lee | F21S 41/143 |

FOREIGN PATENT DOCUMENTS

| | | |
|---|---|---|
| DE | 102013200442 | 2/2014 |
| EP | 2306074 A2 | 4/2011 |
| EP | 2865937 A1 | 4/2015 |
| WO | 2017015684 A1 | 2/2017 |

OTHER PUBLICATIONS

PCT/EP2019/071710, "International Search Report and Written Opinion," dated Dec. 3, 2019, 10 pages.

* cited by examiner

OPTICAL DEVICE

CROSS REFERENCE TO RELATED APPLICATIONS

This application claims priority to International Application No. PCT/CN018/101632 filed on Aug. 22, 2018 titled "AUTOMOTIVE LIGHTING DEVICE FOR VEHICLE," and claims priority to International Application No. PCT/CN2018/120278 filed on Dec. 11, 2018 titled "OPTICAL DEVICE," and claims priority to European Application No. 19150761.5 filed on Jan. 8, 2019 and titled "OPTICAL DEVICE." International Application No. PCT/CN2018/101632 and International Application No. PCT/CN2018/120278 and European Application No. 19150761.5 are incorporated herein by reference.

FIELD OF THE INVENTION

The present invention relates to an optical device for automotive lighting.

BACKGROUND OF THE INVENTION

In the field of optical lighting, such as of automotive lighting, requirements are often imposed for the beam pattern in a desired plane or the light intensity distribution along a desired direction. In this case, efforts shall be paid in choosing a suitable design for components in the optical device. For example, in an automotive front lamp, the high beam is normally required to have its biggest intensity at a horizontal position and to decrease gradually in intensity both above and below horizon, such that not only a smooth transition to the low beam is obtained, but also reflections from for example signboards are reduced. Further, in consideration of efficiency and cost, there are also requirements for designs and/or configurations of components in the optical device.

DE102009053581B3 discloses an automotive front-lighting LED matrix light using a primary optics improving homogeneity of light intensity distribution as well as color uniformity. Among other measures, this document proposes a matrix of funnel-shaped light guides for the primary optics, i.e., light guides with curved lower and upper side faces opening towards their light exit side. WO2017015684A1 discloses a similar base system but further develops on a refined groove structuring of the curved side faces.

Still, it is desirable to provide an optical device for automotive lighting, which helps to give a desired beam pattern or light intensity distribution in accordance with actual requirements, while still achieving a high efficiency or usage of light.

SUMMARY OF THE INVENTION

The present invention provides an optical device, so as to eliminate or at least alleviate one or more of the above mentioned disadvantages.

According to the present invention, an optical device for automotive lighting is proposed. The optical device comprises a plurality of light sources, a plurality of primary optics and a secondary optics. The primary optics are arranged in a matrix, and configured to receive and redirect light from the light sources. The secondary optics is going to receive the redirected light from the primary optics and project out the received light into a desired beam pattern. Further, each of the primary optics is shaped as a light guide, which light guide comprises a light entrance face and a light exit face at two opposite ends thereof, as well as a plurality of side faces extending between the light entrance face and the light exit face. Besides, the light guide is also configured to guide light incident at the light entrance face via total internal reflection in a light guiding direction of the light guide to the light exit face where light is refracted out towards the secondary optics. For at least one light guide, at least one side face thereof is configured to be a curved face, whose curvatures at different positions are designed such that a first desired gradient light intensity distribution is projected out along a desired direction by the secondary optics.

As can be seen, in the optical device proposed by the present invention, light guides are used as the primary optics such that the light transmission is ensured by total internal reflection within the light guides. In this way, the light distribution on the light exit surface of the primary optics, i.e., of the light guide, can be more homogeneous if total internal reflection occurs more times. Further, the present inventors also found that by providing at least one curved side face for at least one of the light guides, and making special choice about curvatures of the curved side face at different positions, a first desired gradient light intensity distribution can be projected out by the secondary optics along a desired direction, for example along a vertical direction. This is very helpful if a certain light intensity distribution is required along a prescribed direction, since curvatures of the curved side face at different positions of the light guide have been found to impose a great influence on the final beam pattern and thereby light intensity distribution projected out by the secondary optics. This means that if curvatures of the curved side face at different positions are changed, light intensities at different locations along a desired direction are going to change accordingly, which facilitates to acquire a desired gradient distribution of light intensity along the desired direction.

According to the present invention, in the optical device as proposed above, the curved face comprises specifically a plurality of facets, each of which is formed by sweeping a respective line along a direction perpendicular to the desired direction, if a desired light intensity distribution is needed along the desired direction. Further, in the embodiment, each line has its two ends spaced apart by a same distance along an optical axis of the light guide, and is provided with a slope such that light intensities projected by the plurality of facets onto the light exit face of the light guide exhibit a second desired gradient light intensity distribution along the desired direction.

For the purpose of providing the curved side face of the light guide with suitable curvatures at different positions so that a second desired gradient light intensity distribution is obtained on the light exit face of the light guide, the present inventors have proposed to utilize processes as follows, where the desired direction is chosen as a vertical direction for example. Firstly, a plurality of lines, each having two ends spaced apart equidistantly along the optical axis of the light guide and showing a different slope, are connected end to end in a vertical plane, such that a polygonal line is formed in the same vertical plane. After that, the polygonal line can be swept along a horizontal direction so as to obtain a curved surface consisting of a plurality of facets, with each facet being formed by the sweep of a respective line along the horizontal direction. Then, a certain light intensity distribution is incident onto the plurality of facets, and light intensities at different locations of the light exit face of the light guide, for example along the vertical direction, are monitored at the same time. In the last step, slopes of the plurality of lines are changed and light intensities at different locations of the light exit face are measured accordingly, until the light intensity distribution, as projected by the plurality of facets onto the light exit face of the light guide, attains the desired shape, at least along the desired, here vertical, direction.

According to some embodiments of the present invention, in the optical device as proposed above, the second desired gradient light intensity distribution, projected by the plurality of facets onto the light exit face of the light guide and after coming out therefrom, is then projected for the second time by the secondary optics as the above mentioned, first desired gradient light intensity distribution. In an optional instance, the secondary optics comprises for example a projection lens, which projection lens helps to project out the input light beam, corresponding to the second desired gradient light intensity distribution coming out from the light exit face of the light guide, as the first desired light intensity distribution along the desired, for example vertical direction.

According to some embodiments of the present invention, in the optical device as described above, optical axes of the light guides, in particular of those distant from the optical axis of the secondary optics, are oriented towards an optical center of the secondary optics, so as to facilitate more light coming from the light guides to enter the secondary optics. As easily understood, there is a high possibility that only a small part of the primary light exiting from an off-axis light guide (i.e., a light guide far away from the optical axis of the device, such as of the secondary optics) is incident onto the secondary optics, if it keeps oriented in a same way as the on-axis light guide (i.e., a light guide located at the optical axis of the device, such as of the secondary optics). In view of above, the present inventors propose to introduce different orientations based on different positions of the light guides with respect to the optical axis of the secondary optics, such that optical axes of the light guides are all pointing towards the optical center of the secondary optics. This ensures to the maximum extent that all the primary light is falling onto the secondary optics, helping to achieve an improved light usage.

Further optionally, in some embodiments of the optical device proposed by the present invention, the light exit faces of the light guides constitute a continuous curved light exit face, for the purpose of facilitating light refracted out by the light guides to enter the secondary optics on the one hand, and compensating for field curvature of the secondary optics on the other hand. Preferably, the continuous curved light exit face has a saddle surface, which is shaped further for being convex away from the secondary optics in a first plane perpendicular to the desired direction and being convex towards the secondary optics in a second plane parallel to the desired direction. Besides, the degree of convexity in the first plane is chosen preferably to be weaker than the degree of convexity in the second plane.

As mentioned above, in an embodiment of the present invention, a continuous saddle shaped light exit face is formed by the light exit faces of the light guides, and specially designed with opposite convexities in two planes, one plane perpendicular to the desired direction and the other plane parallel to the desired direction. This helps to take advantages at least in the following two aspects. According to the first aspect, when the vertical direction is for example used as the desired direction and a section in the horizontal plane (i.e., a plane perpendicular to the vertical direction) is taken of the saddle shaped light exit face, a first curve is found, which is convex away from the secondary optics so that those light guides located off-axis are disposed closer to the secondary optics along its optics axis, thus at least compensating for field curvature of the secondary optics. In the second aspect, if a section in the vertical plane (i.e., a plane parallel to the desired, here vertical, direction) is taken of the saddle shaped light exit face, a second curve is found, which is oppositely convex towards the secondary optics so that light exciting the saddle shaped light exit face is refracted out from the light guides towards the optical center of the secondary optics as much as possible. In this way, the light coming out from the light guides is ensured again to be incident maximally onto the secondary optics.

According to some other embodiments of the present invention, in the optical device as proposed above, a shape of the light exit face for at least one light guide is designed in dependence of a position of the light exit face with respect to the optical axis of the secondary optics. The shape design for the light exit face of the light guide mainly stems from the following considerations. Firstly, if an input beam pattern is located at an off-axis position in the object space of the secondary optics, greater optical distortion will be incurred after projection by the secondary optics into the image space, as compared with an on-axis position in the object space. Thus, in the present invention, it is proposed to introduce shaping for the light exit face of the at least one light guide, in particular of those located at off-axis positions, such that the optical distortion as mentioned above is eliminated or at least alleviated. Further, shape design for the light exit face of a light guide also allows the portion of light beam associated therewith, after being projected by the secondary optics, to exhibit a straight edge towards the projection portion of a neighboring light guide, and/or to exhibit a straight or curved edge that forms part of a boundary of the entire desired beam pattern.

According to some embodiments of the present invention, in the above described optical device, the light exit face of a light guide located at an outer position from the optical axis of the secondary optics comprises at least one side edge, which side edge is especially designed to be tilted towards the optical axis of the secondary optics, even optionally being accompanied by a greater degree of tilted slope with an increase in a distance between the light exit face and the optical axis of the secondary optics. In this way, compensations are obtained in the optical distortion incurred through projection by the secondary optics, thus enabling edges between projection portions from adjacent light exit faces to be straight and thus the light intensity therebetween to be changed gradually.

According to some embodiments of the present invention, in the above described optical device, spacing between adjacent light exit faces of at least two light guides is designed in dependence of a position of the light exit faces with respect to the optical axis of the secondary optics. This helps to compensate for optical aberration introduced by the secondary optics and to project out by the secondary optics a homogenous light intensity distribution between projection portions of adjacent light exit faces. Further, according to a preferable embodiment, the spacing between adjacent light exit faces increases with a distance from the light exit faces to the optical axis of the secondary optics, such that compensations are allowed in optical aberration introduced by the secondary optics. As a specific example, the spacing between adjacent light exit faces is in a range of 0.1 mm to 1.2 mm.

As exemplified above, in an embodiment of the optical device proposed by the present invention, the desired direction is a vertical direction, and the curved face comprises at least one of an upper side face and a lower side face of the light guide. In this case, the first desired gradient light intensity distribution is provided along the vertical direction, which allows the optical device to be used for providing a headlight beam of a vehicle. In an example instance, the first desired gradient light intensity distribution, as projected out by the secondary optics along the vertical direction, is confined below an angle of 5 degrees above the horizon in front of the vehicle, and further optionally, is confined above an angle of 3 degrees below the horizon in front of the vehicle, thus facilitating the use of the optical device to provide an excellent high beam of the vehicle.

It will be appreciated by those skilled in the art that two or more of the above disclosed embodiments, implementations and/or aspects of the present invention may be combined in any way deemed useful. Different modifications and variations of the optical device can be carried out by a person skilled in the art on the basis of the present disclosure.

BRIEF DESCRIPTION OF THE DRAWINGS

These and other aspects of the present invention will be described now in more detail, with reference to the appended drawings showing embodiments and forming a part of the present invention. Specifically, in the drawings:

FIG. 6b schematically illustrates in a partial section view another optical device for comparison with FIG. 6a;

DETAILED DESCRIPTION OF THE EMBODIMENTS

Figure 1:
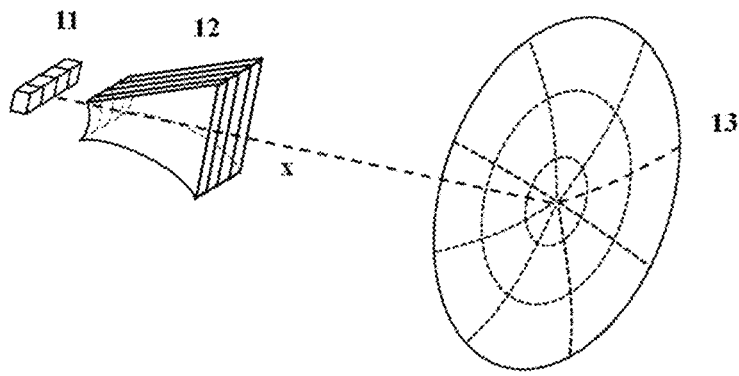
FIG. 1 schematically illustrates in a perspective view an optical device in accordance with an embodiment of the present invention.

While the present invention is susceptible of embodiments in many different forms, there are shown in the drawings and will be described in detail herein one or more specific embodiments, with the understanding that the present description is to be considered only as exemplary of the basic principle of the present invention and not intended to limit the present invention to the specific embodiments shown and described herein.

It should be noted that various components in different figures are not drawn to scale. Besides, relative positions between individual elements shown in the figures are merely used to illustrate the basic principle of the present invention and should not be considered to limit the protection scope of the present invention.

With reference to FIG. 1, an optical device 10 is proposed, which comprises a plurality of light sources 11, a plurality of primary optics 12 and a secondary optics 13, as shown sequentially from left to right in the perspective view of FIG. 1. As an example, the plurality of light sources 11 and the plurality of primary optics 12 are both shown schematically to be in a row arrangement, for example perpendicular to the optical axis x of the secondary optics 13. However, this shall never be deemed as a limitation to the present invention. According to practical applications, any matrix, including a single row, configuration, as well as any other suitable arrangements can be also used for the plurality of light sources 11 and/or primary optics 12, and all these variations or modifications shall fall within the protection scope of the present invention.

Further, as seen in FIG. 1, light coming from the light sources 11 is firstly incident onto the left input faces of the primary optics 12 and then refracted out therefrom at the right output faces, thereby going into the secondary optics 13 that helps to project it out as for example a desired beam pattern.

Figure 2:
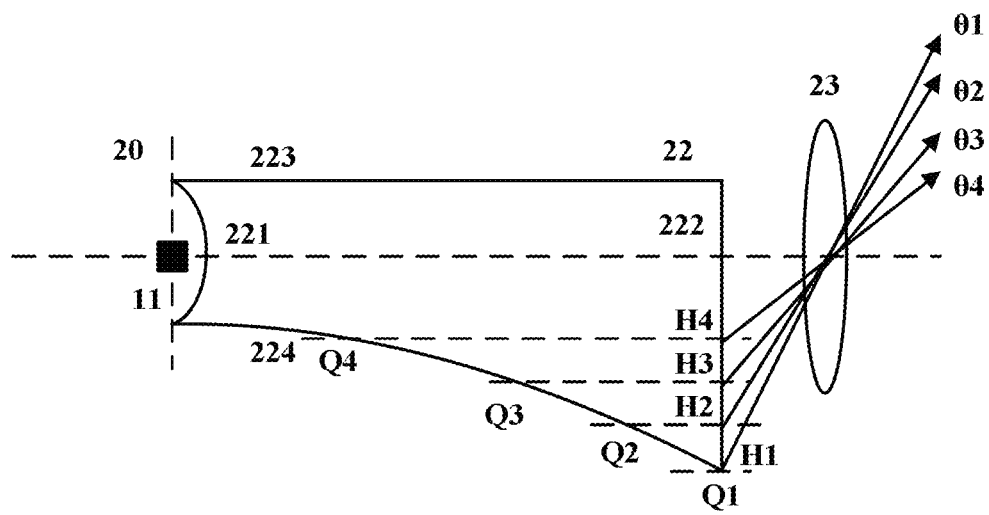
FIG. 2 schematically illustrates in a section view the optical device shown in FIG. 1.

Next, turning to FIG. 2, where the optical device 10 as shown in FIG. 1 is depicted again in a section view. As easily understood, only one light source 11 and one primary optics are included in the section view of FIG. 2, which is different from the perspective view in FIG. 1. In a preferable embodiment of the present invention such as shown in FIG. 2, light guides 22 are used as the primary optics, wherein each light guide 22 comprises a left, light entrance face 221, especially a concave face, and a right, light exit face 222, as well as several side faces 223, 224 extending between the light entrance face 221 and the light exit face 222. In this case, light incident onto the light entrance face 221 of each light guide 22 is allowed to propagate by means of total internal reflection in the light guiding direction of the light guide 22 from left to right towards the light exit face 222, thus facilitating a more uniform distribution of light intensities on the light exit face 222 if more total internal reflections occur. Also, a projection lens 23 is used for example as the secondary optics in the optical device 20 of FIG. 2, which obviously is only provided for illustration but not for limitation. Further, due to a section view, only two side faces, i.e., the upper one 223 and the lower one 224, are shown in FIG. 2 for the light guide 22. Of course, a skilled person shall easily understand that there may be two more side faces, i.e., with respect to the viewing direction of the figure, a front side face and a back side face, that are not shown in the section view of optical device 20 in FIG. 2. With continued reference to FIG. 2, the lower side face 224 of the light guide 22 in the optical device 20 is deigned to be a curved side face. The present inventors have found that by changing curvatures for the curved, lower side face 224 at different positions, such as at positions Q1, Q2, Q3 and Q4, light intensities at different locations and directions, such as at locations H1, H2, H3 and H4 on the light exit face 222 of the light guide 22, and directions θ1, θ2, θ3 and θ4 can be adjusted accordingly. This means that if suitable curvatures are chosen for the curved, lower side face 224 at different positions, a desired, and preferably gradient, light intensity distribution can be formed on the light exit face 222 of the light guide 22. After a further projection by the projection lens 23, the desired light intensity distribution coming from the light exit face 222 of the light guide 22 will become a final light intensity distribution as desired and required upon actual applications.

Figure 3:
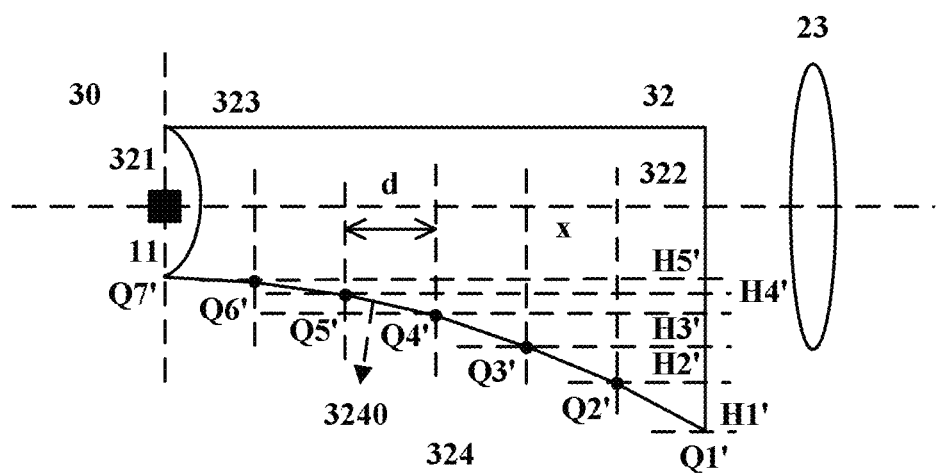
FIG. 3 schematically illustrates in a section view an optical device in accordance with another embodiment of the present invention.

FIG. 3 schematically illustrates in a section view an optical device in accordance with another embodiment of the present invention. The optical device 30 as shown in FIG. 3 is similar to the optical device 20 as shown in FIG. 2, and thus similar reference numerals are used to indicate similar components. To be specific, in FIG. 3, the optical device 30 comprises a light source 11, a light guide 32 and a secondary projection lens 23 as well, wherein the light guide 32 comprises a left light entrance face 321, a right light exit face 322, an upper side face 323 and a lower side face 324. The lower side face 324 of the light guide 32 is further configured to consist of a plurality of facets 3240, wherein each facet 3240 is formed by seeping a respective line, for example line Q1'-Q2', Q2'-Q3', Q3'-Q4', Q4'-Q5', Q5'-Q6' or Q6'-Q7', along a direction perpendicular to the drawing plane of the figure. Further, each line is connected end to end with its neighbors and has a different slope, such that a polygonal line, for example Q1'-Q7', is formed in the vertical plane as shown in FIG. 3. Besides, each line also has its two ends spaced apart by a same distance, such as a distance d shown in FIG. 3, along the optical axis x of the light guide 32 and the projection lens 23, i.e., along a horizontal direction in FIG. 3.

In the following, the principle for determining the slope of each line, that is used for the formation of facets 3240 and also curved side face 324 in FIG. 3, such that a second desired gradient light intensity distribution is projected especially along the vertical direction on the light exit face 322 of the light guide 32, will be explained with detailed reference to the optical device 30 as shown in FIG. 3.

Continuing with the above mentioned lines, for example Q1'-Q2', Q2'-Q3', Q3'-Q4', Q4'-Q5', Q5'-Q6' and Q6'-Q7' in FIG. 3, each is firstly provided with an initial slope, which helps to obtain an initial curved side face 324 consisting of several facets 3240, where each facet 3240 is formed by sweeping a respective line along a direction perpendicular to drawing plane of the figure. After that, an input light beam comprising a predetermined light intensity distribution is allowed to be incident onto the initial curved side face 324 from the top down and reflected thereon, thereby going towards the right, light exit face 322 afterwards. The present inventors have proposed to monitor the light intensities on different locations of the light exit face 322, especially on different locations such as H1', H2', H3', H4' and H5' along the vertical direction, when the slope of each line is changed for example in a gradual way. In particular, light reflected by each facet 3240 formed by the sweep of a respective line can be restricted only to fall onto a corresponding section of the light exit face 322, especially a strip extending perpendicularly to the drawing plane, such as a strip between locations H1' and H2', H2' and H3', H3' and H4', and H4' and H5'. All these strips together constitute the primary light intensity distribution as reflected by the lower, curved side face 324 onto the light exit face 322 of the light guide 32. According to qualitative analysis, if a steep facet 3240 is oriented with a smaller angle relative to the vertical direction, light incident thereon will be reflected more downwards and the distribution thereof is also expanded. The present inventors propose to utilize such an influence as imposed by the slope of a reflective facet onto the reflected light intensity distribution. This means that, the main task is to ascertain a proper slope for each line, thus forming a respective facet 3240 of the curved side face 324, such that the reflected light intensities on the light exit face 322 exhibit a desired gradient distribution for example along the vertical direction.

Having benefited from the above disclosure of the present invention, those skilled in the art will easily understand that the more lines we use for the reflective, curved side face 324, the better gradient effect between adjacent strips on the light exit face 322 will be achieved. Therefore, in calculations, the number of lines is preferably selected to be as large as possible. However, a large number of lines results necessarily in a huge amount of computation, and thus a compromise shall be made between the two. The same effect can be also accomplished by reducing the horizontal distance d between adjacent lines. In this case, considering further the amount of computation, an approach called the cubic spline interpolation can be used, wherein more sub-lines between positions Q1' and Q2', Q2' and Q3', Q3' and Q4', Q4' and Q5', Q5' and Q6', and Q6' and Q7' can be formed by interpolation. This helps to provide the reflected light intensity distribution for example along the vertical direction on the light exit face 322 with a more uniformly gradient effect, leading to an improved comfort level for users.

With back reference to FIG. 2, the reflected light intensity distribution on the light exit face 222 is then refracted out from the light guide 22 towards the secondary optics, i.e., here the projection lens 23. The primary reflected light intensity distribution on the light exit face 222 is thus changed simply by projection into a corresponding distribution, for example along the vertical direction as well, in the image space of the projection lens 23. As also seen in FIG. 2, the strip of light pattern H1-H2 on the light exit face 222 of the light guide 22 is projected into the section θ1-θ2 in the image space, the strip of light pattern strip H2-H3 is projected into the section θ2-θ3, and the strip of light pattern strip H3-H4 is projected into the section θ3-θ4, thus constituting the final projected beam pattern with a first desired gradient light intensity distribution for example along the desired vertical direction.

Figure 4:
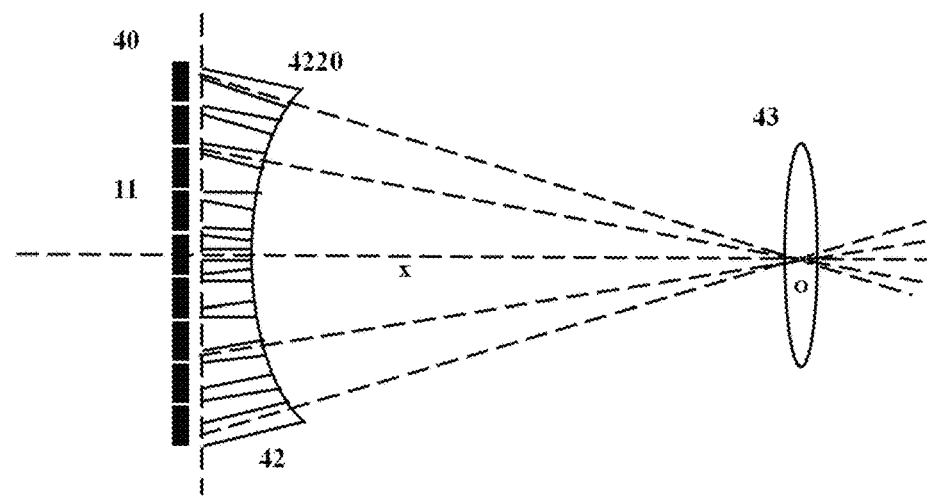
FIG. 4 schematically illustrates in a plane view an optical device in accordance with an embodiment of the present invention.
Figure 5:
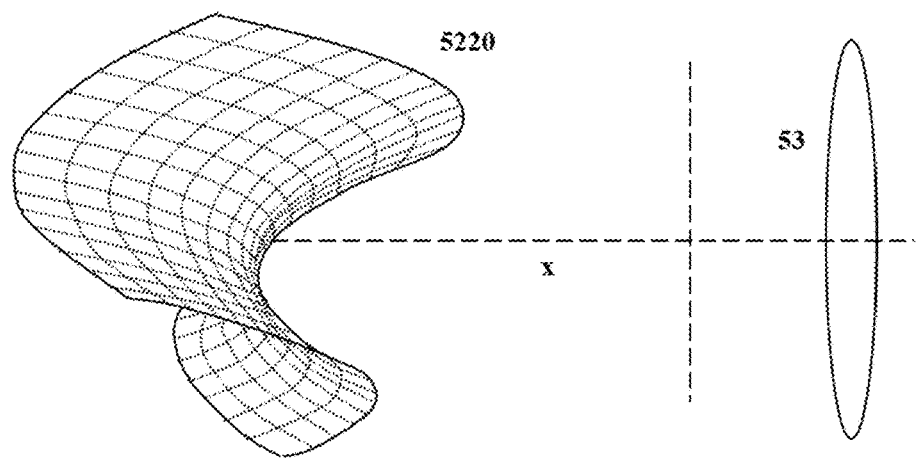
FIG. 5 schematically illustrates in a perspective view a continuous curved light exit face as formed for the array of light guides in the optical device of FIG. 4, where the secondary optics, here a projection lens, is also included for reference.
Figure 6A:
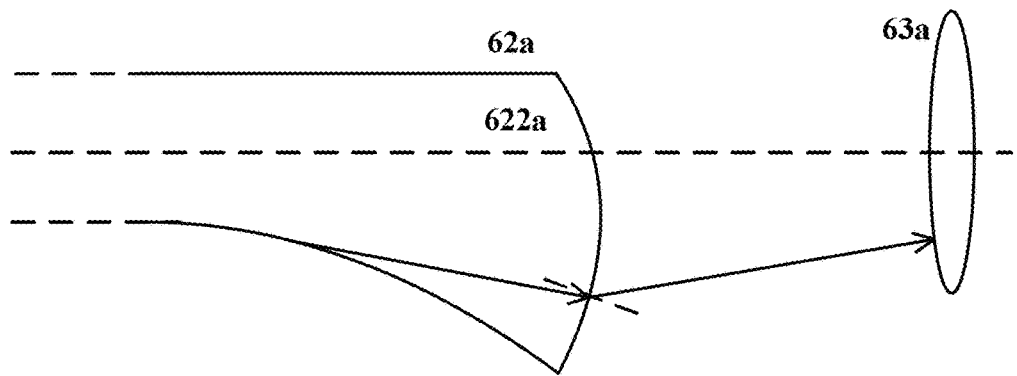
FIG. 6a schematically illustrates in a partial section view the optical device shown in FIG. 4.
Figure 6B:
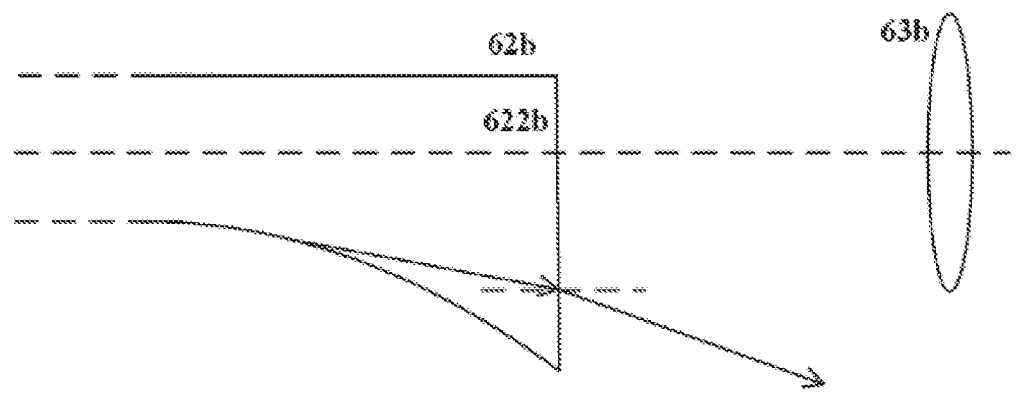

Next, references will be made to FIGS. 4-6 to explain in more detail about designing the light exit face of the light guide, where FIG. 4 schematically illustrates a plane view of an optical device according to an embodiment of the present invention; FIG. 5 schematically illustrates in a perspective view a continuous curved light exit face as formed for the array of light guides in the optical device of FIG. 4, where the secondary optics, here a projection lens, is also included for reference; FIG. 6a schematically illustrates in a partial section view the optical device shown in FIG. 4; and FIG. 6b schematically illustrates in a partial section view another optical device for comparison with FIG. 6a.

As an example, with reference to the optical device 40 shown in FIG. 4, a plurality of light guides 42 is arranged in an array perpendicular to the optical axis x of the projection lens 43, and all of them have their optical axes pointing towards the optical center O of the projection lens 43. In this way, light emitted from the light sources 11 and coming out from the light guides 42, especially from the off-axis ones of the light guides 42, is ensured to be incident onto the projection lens 43 to a maximized degree. Finally, an increase is facilitated in the light usage or efficiency. Proceeding with the optical device 40 shown in FIG. 4, the light exit faces of the light guides 42 constitute together a single continuous curved light exit face 4220 for the entire array of light guides 42. Details are provided in the following with regard to the continuous curved light exit face 4220, and references will be made to both FIG. 5 and FIG. 6. Herein, it should be noted that for the sake of clarity, the array of light guides 42 are shown in FIG. 4 with spacings between adjacent ones. However, this is only done for clarity of depiction and should never be deemed as a limitation to the present invention. Also, in FIG. 4, optical axes are schematically depicted for only a few of the light guides 42, not all of them, again for the sake of clarity.

As easily understood, when disposed far away from the optical axis of the projection lens in the object space, due to the effect of field curvature, an input beam pattern will undergo a larger distortion when projected out into the image space by the projection lens. With reference to FIG. 5, in order to overcome such a distortion, the present inventors have proposed to provide the single continuous curved light exit face 5220 for the whole array of light guides with a first convexity for example in the horizontal plane, which first convexity is specially configured to be convex away from the projection lens 53. In this way, the off-axis light guides are ensured to be positioned nearer to the projection lens 53 along the optical axis x of the projection lens 53, as compared with the on-axis light guides. This helps to avoid or at least alleviate the effect of field curvature by the projection lens 53. Such a first convexity away from the projection lens 53 is clearly visible in the perspective view of FIG. 5.

Apart from the above mentioned first convexity in the horizontal plane, in an embodiment of the present invention, a second convexity is also included in the vertical plane. Specifically, as shown in FIG. 5 as well, when a section is taken in the vertical plane for the continuous curved light exit face 5220 of the light guides, the second convexity is clearly convex towards the right, thus, towards the projection lens 53. This gives the continuous curved light exit face 5220 with a saddle shape for the array of light guides. Obviously, the second convexity in the vertical plane is in an opposite direction as compared with the first convexity in the horizontal plane. The special design for the second convexity in the vertical plane of the continuous curved light exit face 5220 will be explained in more detail together with the section view shown in FIG. 6a.

As mentioned above, the section taken in the vertical plane of the continuous curved light exit face 5220 in FIG. 5 provides us with a second convexity that is convex towards the projection lens 53. This is visible in the section view of FIG. 6a, where the continuous curved light exit face 622a is obviously convex towards the projection lens 63a in the vertical plane. Besides, a comparison optical device is also included in the section view of FIG. 6b, where no curvature is provided at all for the continuous curved light exit face 622b in the vertical plane. This means that in the comparison optical device, the continuous curved light exit face 622b for the array of light guides 62b exhibits a straight line in the vertical section. Apparently, by making comparisons between the two optical devices shown respectively in FIG. 6a and FIG. 6b, light coming out from the light guides 62a in the optical device of FIG. 6a (i.e., having a convexity in the vertical section) will be reflected onto the secondary optics 63a to a greater extent, as compared with the light coming out from the light guides 62b in the optical device of FIG. 6b (where no curvature is incorporated at all in the vertical section). The reason is that the portion of light coming out from the array of light guides 62b near its edge, especially in a direction away from the optical axis of the projection lens 63b, is lost as no convexity towards the projection lens 63b is introduced for the continuous light exit face 622b (see FIG. 6b), but is refracted towards the projection lens 63a in the setup of FIG. 6a due to the convex light exit face 622a. In the end, a higher percentage of light usage is facilitated with the help of such a convexity for example in the vertical plane.

Figure 7:
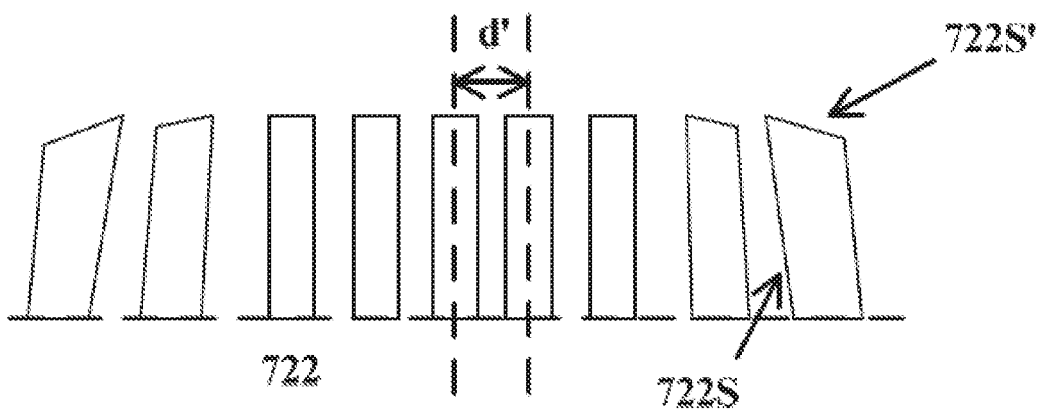
FIG. 7 schematically illustrates in a front view light exit faces of light guides in an optical device in accordance with an embodiment of the present invention.

In the following paragraphs, discussions will be given with respect to a shape of the light exit face of each light guide as well as a spacing between adjacent light guides, more precisely between adjacent light exit faces. Again, as an example, light guides are arranged in an array perpendicular to the optical axis of the secondary optics, here again a projection lens, just as the embodiments recited above in FIGS. 4-6. As shown in FIG. 7, according to an embodiment of the present invention, light exit faces of each light guide in an optical device are schematically illustrated in a front view, for example a view obtained when looking towards the array of primary optics 12 from the secondary optics 13 in FIG. 1. Correspondingly, in FIG. 8, a light pattern as projected by the projection lens for example in a vertical plane is shown schematically after light comes out from the light exit faces shown in FIG. 7.

Figure 8:
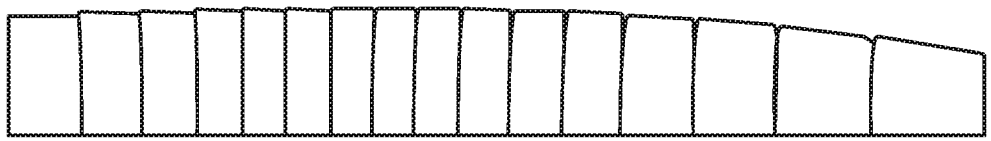
FIG. 8 schematically illustrates in a front view a light pattern as projected by the secondary optics after the primary light comes out from the light exit faces shown in FIG. 7.

As restricted by the aberration effect, when compared with an on-axis position, a strip beam pattern, such as extending along a vertical direction, will undergo a larger aberration after projection by the projection lens if it is displaced farer away from the optical axis of the projection lens. This means that the output beam pattern in the image space of the projection lens will become distorted for example along the vertical direction, introducing some curvature for sides of the output beam pattern, and leading to an undesired beam pattern. In view of above, as shown in FIG. 7, the present inventors have proposed to provide the light exit face 722, especially an inner edge 722S of an outer light guide (i.e., located at a position far away from the optical axis of the projection lens) with a deliberate slope, especially in an opposite direction as compared with the output beam pattern, so as to compensate for the unfavorable curvature or convexity induced by aberration of the projection lens. The special slope design in edge 722S of light exit face 722 of an outer light guide and the respective output of beam patterns are shown respectively in FIGS. 7 and 8, where borders between adjacent images coming from adjacent light exit faces 722 are clearly more like straight lines. This is beneficial for a gradual change between adjacent images coming from adjacent light exit faces of adjacent light guides, and a first desired gradient light intensity distribution obtained in the entire projected beam pattern. Further optionally, with continued reference to FIG. 7, for at least the outermost light guide, the light exit face thereof can be inclined also at upper and lower edges 722S', such that the image as projected thereby is in a desired shape. It should be noted that in FIGS. 7 and 8, only one row of light guides are shown along with its output light pattern, but this shall never be deemed as a limitation to the present invention. Having benefited from teachings of the present invention, a skilled person will easily ascertain that a second row of light guides can be used as well, which may be arranged mirror-symmetrically about the horizontal plane to the row as shown in FIG. 7, and accordingly, a second light pattern, which is mirror-symmetrically about the horizontal plane to the light pattern as shown in FIG. 8 can be obtained too. Obviously, any other rows of light guides can be added as well based on different applications and/or requirements.

According to some other embodiments of the present invention, in the optical device as mentioned above, a spacing d' between adjacent light guides, or more precisely, adjacent light exit faces 722 is set in dependence of a position of the light guides or light exit faces 722 relative to the optical axis of the projection lens. For example, the spacing d' is preferably chosen to increase with a distance from the light guides or light exit faces 722 to the optical axis of the projection lens. This again stems from considerations in optical aberration, because as mentioned above, the input, off-axis beam patterns are undergoing more distortions due to the optical aberration as compared with the input, on-axis beam patterns, such as more curvatures or expansions. Therefore, by using a larger spacing between adjacent light guides or light exit faces 722 for an increased distance from the light guides or light exit faces 722 to the optical axis of the projection lens, adverse effects caused by the optical aberration can be avoided or at least relieved, and also a more homogenous light intensity distribution is obtained between projections coming from adjacent light guides or light exit faces 722. As an example, the spacing between adjacent light exit faces 722 may be in a range of 0.1 mm to 1.2 mm, which is clearly provided only for illustration but not for limitation.

According to some embodiments of the optical device proposed by the present invention, the final light intensity distribution projected out by the secondary optics is for example confined below an angle of 5 degrees above the horizon in front of a vehicle, and further preferably confined above an angle of 3 degrees below the horizon in front of the vehicle. In this way, the optical device becomes suitable for providing a high beam of the vehicle.

In summary, the present invention proposes an optical device, comprising: light sources, primary optics and secondary optics, where light guides are used as the primary optics and provided with at least one curved side face, which curvatures at different positions are designed in such a way that a first desired gradient light intensity distribution is projected out along a desired direction, such as along a vertical direction, by the secondary optics.

It should also be noted that the above-mentioned embodiments illustrate rather than limit the present invention, and that those skilled in the art will be able to design many alternative embodiments without departing from the scope and spirit of the present invention. Although the present invention has been described in connection with some embodiments, it is not intended to be limited to the specific forms as set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate.

In the claims, any reference signs placed between parentheses shall not be construed as limiting the claims. Use of the verb "comprise" and its conjugations does not exclude the presence of elements or steps other than those stated in a claim. The article "a" or "an" preceding an element does not exclude the presence of a plurality of such elements. Also, references to first, second etc. are merely to be considered as labels and do not imply or describe any ordering, sequence, relation or properties of the features prefixed by these terms. The mere fact that certain measures are recited in mutually different dependent claims does not indicate that a combination of these measures cannot be used to advantage.

LIST OF REFERENCE NUMERALS

10, 20, 30, 40 optical device
11 light source
12 primary optics
13 secondary optics
x optical axis of secondary optics
22, 32, 42, 62a, 62b light guide
23, 43, 53, 63a, 63b projection lens
221, 321 light entrance face
222, 322, 622a, 622b, 722 light exit face of light guide
223, 323 upper side face
224, 324 lower side face
3240 facet
4220, 5220 continuous curved light exit face of the array of light guides
722S, 722S' edges of light exit face of light guide
d distance between line ends
d' spacing between adjacent light exit faces of light guides
H1, H2, H3, H4, H1', H2', H3', H4', H5' locations on light exit face
O optical center of secondary optics
Q1, Q2, Q3, Q4 locations on curved side face
Q1', Q2', Q3', Q4', Q5', Q6', Q7' end points of lines
θ1, θ2, θ3 and θ4 directions towards secondary optics

The invention claimed is:

1. An optical device for automotive lighting, comprising:
a plurality of light sources;
a plurality of primary optics arranged in a matrix and configured to receive and redirect light from the plurality of light sources; and
a secondary optics configured to receive the redirected light from the plurality of primary optics and project out the received light into a desired beam pattern,
wherein each primary optics is shaped as a light guide with a light entrance face and a light exit face at two opposite ends thereof, which light guide is configured to guide light incident at the light entrance face via total internal reflection in a light guiding direction of the light guide to the light exit face where light is refracted out towards the secondary optics, and
wherein each light guide further comprises a plurality of side faces extending between the light entrance face and the light exit face,
wherein, for at least one light guide, at least one side face comprises a curved face, whose curvatures at different positions are designed such that a first desired gradient light intensity distribution is projected out along a desired direction by the secondary optics and
wherein the curved face comprises a plurality of facets, each of which is formed by sweeping a respective line along a direction perpendicular to the desired direction and perpendicular to the light guiding direction of the at least one light guide, the respective lines of the facets of the plurality of facets forming a polygonal line,
wherein each line has its two ends spaced apart by a same distance along an optical axis of the at least one light guide, and
wherein each line is provided with a different slope such that light intensities projected by the plurality of facets onto the light exit face of the at least one light guide exhibit a second desired gradient light intensity distribution along the desired direction.

2. The optical device according to claim 1, wherein
the second desired gradient light intensity distribution is projected out by the secondary optics as the first desired gradient light intensity distribution.

3. The optical device according to claim 1, wherein
optical axes of the light guides are oriented towards an optical center of the secondary optics.

4. The optical device according to claim 3, wherein
the light exit faces of the light guides constitute a continuous curved face for at least one of: facilitating light refracted out by the light guides to enter the secondary optics, and compensating for field curvature of the secondary optics.

5. The optical device according to claim 4, wherein
the continuous curved face has a saddle surface in a way that it is convex away from the secondary optics in a first plane perpendicular to the desired direction and convex towards the secondary optics in a second plane parallel to the desired direction, wherein the degree of convexity in the first plane is weaker than that in the second plane.

6. The optical device according to claim 1, wherein
for at least one light guide, a shape of the light exit face is designed in dependence of a position of the light exit face relative to an optical axis of the secondary optics to compensate for optical distortion of the secondary optics and provide, as projected out by the secondary optics, at least one of: a) a straight edge towards the projection of a neighboring light guide, and b) a straight or curved edge forming part of a boundary of the desired beam pattern.

7. The optical device according to claim 6, wherein
the at least one light guide with the designed shape of the light exit face is located at an outer position from the optical axis of the secondary optics, and the light exit face thereof comprises at least one side edge that is tilted towards the optical axis of the secondary optics, wherein the tilted slope is proportional to a distance between the light exit face and the optical axis of the secondary optics.

8. The optical device according to claim 1, wherein
a spacing between adjacent light exit faces of at least two light guides is designed in dependence of a position of the light exit faces relative to an optical axis of the secondary optics to compensate for optical aberration of the secondary optics and provide, as projected out by the secondary optics, a homogenous light intensity distribution between the projections of the adjacent light exit faces.

9. The optical device according to claim 8, wherein
the spacing between adjacent light exit faces increases with a distance of the light exit faces to the optical axis of the secondary optics.

10. The optical device according to claim 8, wherein
the spacing between adjacent light exit faces is in a range of 0.1 mm to 1.2 mm.

11. The optical device according to claim 1, wherein
the desired direction comprises a vertical direction,
the curved face comprises at least one of an upper side face and a lower side face of the light guide, and
the optical device is configured for providing a headlight beam of a vehicle.

12. The optical device according to claim 11, wherein
the first desired gradient light intensity distribution is confined below an angle of 5 degrees above the horizon in front of the vehicle.

13. The optical device according to claim 12, wherein
the first desired gradient light intensity distribution is further confined above an angle of 3 degrees below the horizon in front of the vehicle.

14. The optical device according to claim 13, wherein
the optical device is further configured for providing a high beam of the vehicle.

* * * * *